United States Patent
Berg et al.

(10) Patent No.: US 10,139,124 B2
(45) Date of Patent: Nov. 27, 2018

(54) METHOD AND APPARATUS FOR SYSTEM DIAGNOSTICS USING ACCELEROMETERS

(71) Applicant: Lennox Industries Inc., Richardson, TX (US)

(72) Inventors: Eric Berg, The Colony, TX (US); Payam Delgoshaei, Addison, TX (US)

(73) Assignee: Lennox Industries Inc., Richardson, TX (US)

(*) Notice: Subject to any disclaimer, the term of this patent is extended or adjusted under 35 U.S.C. 154(b) by 128 days.

(21) Appl. No.: 15/405,419

(22) Filed: Jan. 13, 2017

(65) Prior Publication Data
US 2018/0202679 A1    Jul. 19, 2018

(51) Int. Cl.
| | |
|---|---|
| F24F 11/62 | (2018.01) |
| F24F 11/30 | (2018.01) |
| G01M 99/00 | (2011.01) |
| F24F 11/52 | (2018.01) |
| F24F 11/64 | (2018.01) |
| F24F 11/32 | (2018.01) |

(52) U.S. Cl.
CPC ............. *F24F 11/30* (2018.01); *F24F 11/62* (2018.01); *G01M 99/008* (2013.01); *F24F 11/32* (2018.01); *F24F 11/52* (2018.01); *F24F 11/64* (2018.01)

(58) Field of Classification Search
CPC .. F24F 11/52; F24F 11/64; F24F 11/32; F24F 11/30
USPC ........................................................ 73/579
See application file for complete search history.

(56) References Cited

U.S. PATENT DOCUMENTS

| | | | |
|---|---|---|---|
| 8,417,482 B2* | 4/2013 | Bohan ................. | G01K 15/007 702/182 |
| 8,670,870 B1* | 3/2014 | Bush, Jr. ................ | F24F 1/022 700/276 |
| 9,449,435 B2 | 9/2016 | Kalinadhabhotla et al. | |
| 2007/0005269 A1* | 1/2007 | Mitchell .............. | G01B 11/162 702/35 |
| 2008/0148818 A1* | 6/2008 | Speranza ........... | G05B 23/0283 73/40.5 R |
| 2011/0010130 A1* | 1/2011 | Hadden ............. | G05B 23/0248 702/181 |
| 2013/0030724 A1* | 1/2013 | Friedlander ........... | G01N 9/002 702/56 |

* cited by examiner

*Primary Examiner* — J M Saint Surin
(74) *Attorney, Agent, or Firm* — Winstead PC

(57) ABSTRACT

A method of monitoring component health of a heating, ventilation, and air conditioning (HVAC) system. The method includes measuring, by an accelerometer associated with at least one component of the HVAC system, of vibration of the at least one component, receiving, by a controller, actual vibration data reflective of the measured vibration, determining, using the controller, whether the actual vibration data differs from pre-defined acceptable baseline vibration data by more than an acceptable amount, and responsive to a positive determination in the determining step, forwarding, by the controller, information regarding the determination to a monitoring device to monitor operation of the component.

20 Claims, 4 Drawing Sheets

METHOD AND APPARATUS FOR SYSTEM DIAGNOSTICS USING ACCELEROMETERS

TECHNICAL FIELD

The present invention relates generally to heating, ventilation, and air conditioning (HVAC) systems and, more particularly, but not by way of limitation, to detecting component malfunction within HVAC systems by monitoring vibration of various components of the HVAC system.

HISTORY OF RELATED ART

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air).

SUMMARY OF THE INVENTION

A method of monitoring component health of a heating, ventilation, and air conditioning (HVAC) system. The method includes measuring, by an accelerometer associated with at least one component of the HVAC system, of vibration of the at least one component, receiving, by a controller, actual vibration data reflective of the measured vibration, determining, using the controller, whether the actual vibration data differs from pre-defined acceptable baseline vibration data by more than an acceptable amount, and responsive to a positive determination in the determining step, forwarding, by the controller, information regarding the determination to a monitoring device to monitor operation of the component.

A heating, ventilation, and air conditioning (HVAC) system. They system includes an accelerometer associated with at least one component of the HVAC system, wherein the accelerometer is configured to measure vibration of the at least one component. The system further includes a controller configured to communicate with the accelerometer. The controller is configured to receive actual vibration data reflective of the measured vibration, determine whether the actual vibration data differs from pre-defined acceptable baseline vibration data by more than an acceptable amount, and responsive to a positive determination, forward information regarding the determination to a monitoring device to monitor operation of the component.

A method of monitoring component health of a heating, ventilation, and air conditioning (HVAC) system. The method includes measuring, by an accelerometer associated with at least one component of the HVAC system, of vibration of the at least one component, receiving, by a controller, actual vibration data reflective of the measured vibration, and calculating, using the controller, pre-defined acceptable baseline vibration data. The method further includes determining, using the controller, whether the actual vibration data differs from the pre-defined acceptable baseline vibration data by more than an acceptable amount and responsive to a positive determination in the determining step, forwarding, by the controller, information regarding the determination to a monitoring device to monitor operation of the component.

BRIEF DESCRIPTION OF THE DRAWINGS

A more complete understanding of embodiments of the present invention may be obtained by reference to the following Detailed Description when taken in conjunction with the accompanying Drawings wherein.

DETAILED DESCRIPTION OF ILLUSTRATIVE EMBODIMENTS

To direct operations of the circulation fan and other components, each HVAC system includes at least one controller. In addition to directing the operation of the HVAC system, the at least one controller may also be used to monitor various components, also referred to as equipment, of the HVAC system to determine if the HVAC system components are functioning appropriately. Thus, the at least one controller can detect an occurrence of a service event, generate a service alarm, and send a message to a user interface or a service provider. The service event may be, for example, a trigger of a service indicator, an expiration of a service event timer for a component of the HVAC system, component malfunction, and the like.

Figure 1:
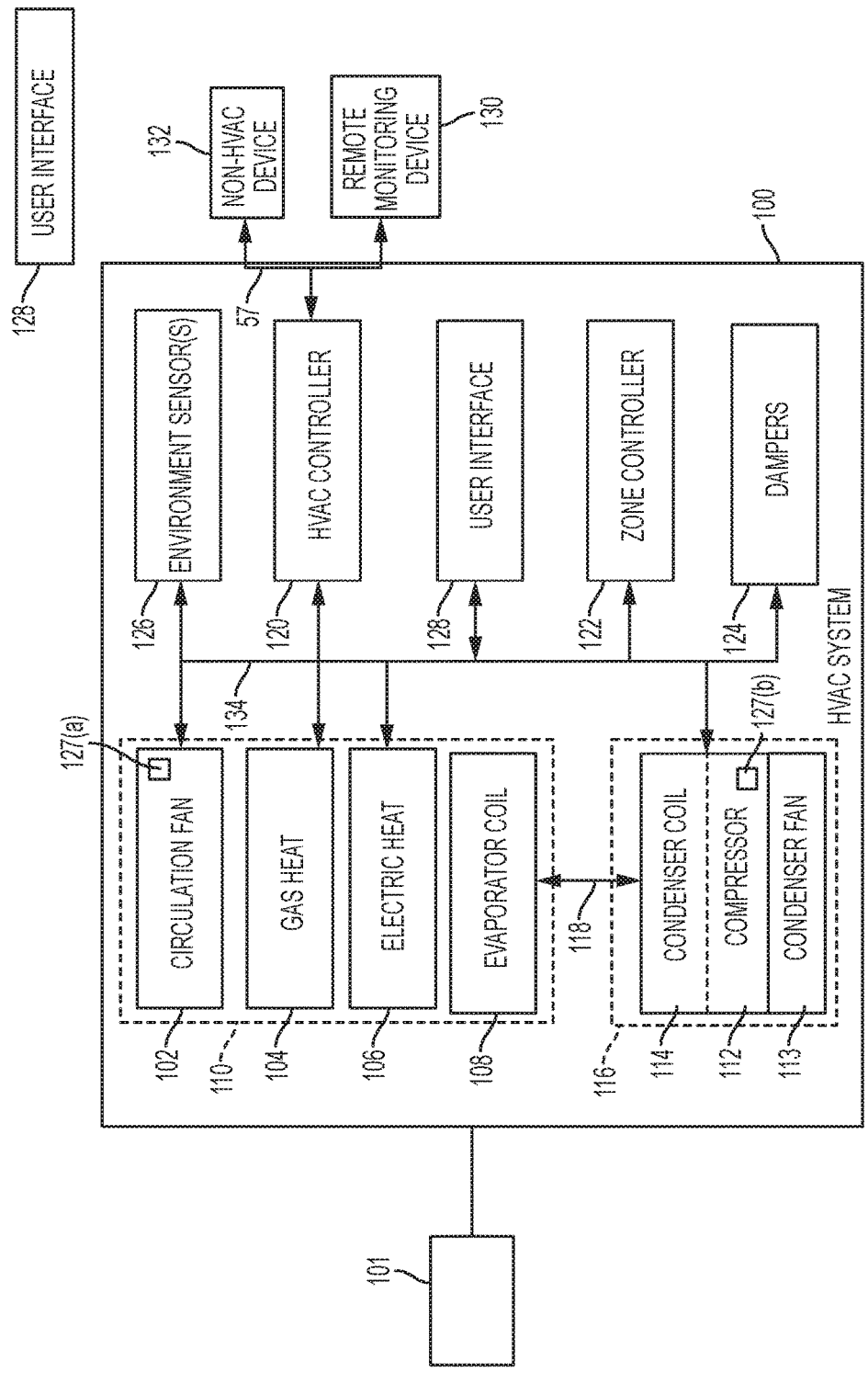
FIG. 1 is a block diagram of an illustrative HVAC system.

FIG. 1 illustrates an HVAC system 100. In a typical embodiment, the HVAC system 100 is a networked HVAC system configured to condition air via, for example, heating, cooling, humidifying, or dehumidifying. The HVAC system 100 can be a residential system or a commercial system such as, for example, a roof top system. For illustration, the HVAC system 100 as illustrated in FIG. 1 includes various components; however, in other embodiments, the HVAC system 100 may include additional components that are not illustrated but typically included within HVAC systems.

The HVAC system 100 includes a variable-speed circulation fan 102, a gas heat 104, electric heat 106 typically associated with the variable-speed circulation fan 102, and a refrigerant evaporator coil 108, also typically associated with the variable-speed circulation fan 102. The variable-speed circulation fan 102, the gas heat 104, the electric heat 106, and the refrigerant evaporator coil 108 are collectively referred to as an "indoor unit" 110. In a typical embodiment, the indoor unit 110 is located within, or in close proximity to, an enclosed space 101. The HVAC system 102 also includes a variable-speed compressor 112, an associated condenser coil 114, and a condenser fan 113, which are typically referred to as an "outdoor unit" 116. In a typical embodiment, the condenser fan 113 may be at least one of a fixed-speed condenser fan, a multi-speed condenser fan, and a variable-speed condenser fan. In various embodiments, the outdoor unit 116 is, for example, a rooftop unit or a ground-level unit. The variable-speed compressor 112 and the associated condenser coil 114 are connected to an associated evaporator coil 108 by a refrigerant line 118. In a typical embodiment, the variable-speed compressor 112 is, for example, a single-stage compressor, a multi-stage compressor, a single-speed compressor, or a variable-speed compressor. The variable-speed circulation fan 102, sometimes referred to as a blower, is configured to operate at different capacities (i.e., variable motor speeds) to circulate air through the HVAC system 100, whereby the circulated air is conditioned and supplied to the enclosed space 101.

For illustrative purposes, only variable-speed circulation fan 102 is disclosed; however, in other embodiments, fixed speed and multi-speed circulation fans may be used as required. Additionally, for illustrative purposes, only variable-speed compressor 112 is disclosed; however, in other embodiments, fixed speed and multi-stage compressors may be used as required.

Still referring to FIG. 1, the HVAC system 100 includes an HVAC controller 120 that is configured to control operation of the various components of the HVAC system 100 such as, for example, the variable-speed circulation fan 102, the gas heat 104, the electric heat 106, the variable-speed compressor 112, and the condenser fan 113. In some embodiments, the HVAC system 100 can be a zoned system. In such embodiments, the HVAC system 100 includes a zone controller 122, dampers 124, and a plurality of environment sensors 126. In a typical embodiment, the HVAC controller 120 cooperates with the zone controller 122 and the dampers 124 to regulate the environment of the enclosed space 101.

The HVAC controller 120 may be an integrated controller or a distributed controller that directs operation of the HVAC system 100. In a typical embodiment, the HVAC controller 120 includes an interface to receive, for example, thermostat calls, component health data, temperature setpoints, blower control signals, environmental conditions, and operating mode status for various zones of the HVAC system 1. In a typical embodiment, the HVAC controller 120 also includes a processor and a memory to direct operation of the HVAC system 100 including, for example, a speed of the variable-speed circulation fan 102.

Still referring to FIG. 1, in some embodiments, the plurality of environment sensors 126 are associated with the HVAC controller 120 and also optionally associated with a user interface 128. In some embodiments, the user interface 128 provides additional functions such as, for example, operational, diagnostic, status message display, and a visual interface that allows at least one of an installer, a user, a support entity, and a service provider to perform actions with respect to the HVAC system 100. In some embodiments, the user interface 128 is, for example, a thermostat of the HVAC system 100. In other embodiments, the user interface 128 is associated with at least one sensor of the plurality of environment sensors 126 to determine the environmental condition information and communicate that information to the user. The user interface 128 may also include a display, buttons, a microphone, a speaker, or other components to communicate with the user. Additionally, the user interface 128 may include a processor and memory that is configured to receive user-determined parameters, and calculate operational parameters of the HVAC system 100 as disclosed herein.

In a typical embodiment, the HVAC system 100 is configured to communicate with a plurality of devices such as, for example, a monitoring device 130, a communication device 132, and the like. In a typical embodiment, the monitoring device 130 is not part of the HVAC system. For example, the monitoring device 130 is a server or computer of a third party such as, for example, a manufacturer, a support entity, a service provider, and the like. In other embodiments, the monitoring device 130 is located at an office of, for example, the manufacturer, the support entity, the service provider, and the like.

In a typical embodiment, the communication device 132 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 132 includes at least one processor, memory and a user interface, such as a display. One skilled in the art will also understand that the communication device 132 disclosed herein includes other components that are typically included in such devices including, for example, a power supply, a communications interface, and the like.

The zone controller 122 is configured to manage movement of conditioned air to designated zones of the enclosed space. Each of the designated zones include at least one conditioning or demand unit such as, for example, the gas heat 104 and at least one user interface 128 such as, for example, the thermostat. The zone-controlled HVAC system 100 allows the user to independently control the temperature in the designated zones. In a typical embodiment, the zone controller 122 operates electronic dampers 124 to control air flow to the zones of the enclosed space.

In some embodiments, a data bus 134, which in the illustrated embodiment is a serial bus, couples various components of the HVAC system 100 together such that data is communicated therebetween. In a typical embodiment, the data bus 134 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 134 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 134 may include any number, type, or configuration of data buses 134, where appropriate. In particular embodiments, one or more data buses 134 (which may each include an address bus and a data bus) may couple the HVAC controller 120 to other components of the HVAC system 100. In other embodiments, connections between various components of the HVAC system 100 are wired. For example, conventional cable and contacts may be used to couple the HVAC controller 120 to the various components. In some embodiments, a wireless connection is employed to provide at least some of the connections between components of the HVAC system such as, for example, a connection between the HVAC controller 120 and the variable-speed circulation fan 102 or the plurality of environment sensors 126.

Typically, in HVAC systems, most sound or noise is generated via rotating equipment and air and fluid movement through ducts and pipes. This movement results in vibration of the various components of the HVAC system 100. Controlling the vibration of the various components of the HVAC system 100 is important since vibration is the primary source of noise in HVAC systems. HVAC systems that neglect to properly address vibration may result in malfunctioning components, noise, and, in some cases, catastrophic failure. In an effort to monitor vibration of HVAC system components and prevent component malfunction, exemplary embodiments disclose placing accelerometers at various components of the HVAC system 100. In the context of the present application, an accelerometer is defined as a device that detects, monitors, and measures vibration in machinery.

The HVAC system 100 includes a plurality of accelerometers 127a, 127b that are positioned on various components of the HVAC system 100. In particular, a first accelerometer 127(a) is positioned on the variable-speed circulation fan 102 and a second accelerometer 127(b) is positioned on the variable-speed compressor 112. For illustrative purposes, only two accelerometers 127(a), 127(b) are disclosed as being positioned on the variable-speed circulation fan 102 and the variable-speed compressor 112, respectively; however, in alternative embodiments, additional accelerometers may be positioned on other components as dictated by design requirements. In a typical embodiment, the first and second accelerometers 127(a), 127(b) are configured to monitor HVAC system component health by measuring vibration of the HVAC system components such as, for example, the variable-speed circulation fan 102, the variable-speed compressor 112, and the condenser fan 113 of the HVAC controller 120. The measured vibration ("vibration data") of the variable-speed circulation fan 102, the variable-speed compressor 112, and the condenser fan 113 is utilized by the HVAC controller 120 to monitor operation of HVAC system components and detect faults before the HVAC system components fail.

In a typical embodiment, the first and second accelerometers 127(a), 127(b) are configured to communicate with the HVAC controller 120. In particular, the first and second accelerometers 127(a), 127(b) are configured to communicate vibration data of the HVAC system components such as, for example, the variable-speed circulation fan 102 and the variable-speed compressor 112 to the HVAC controller 120. In some embodiments, the data bus 134 may couple the HVAC controller 120 to the first and second accelerometers 127(a), 127(b). In other embodiments, connections between the HVAC controller 120 and the first and second accelerometers 127(a), 127(b) are wired. For example, conventional cable and contacts may be used to couple the HVAC controller 120 to the first and second accelerometers 127(a), 127(b). In some embodiments, a wireless connection is employed to provide at least some of the connections between the HVAC controller 120 and the first and second accelerometers 127(a), 127(b).

In a typical embodiment, the first accelerometer 127(a) is positioned on the variable-speed circulation fan 102 and is configured to measure vibration of the variable-speed circulation fan 102 over time. For example, the first accelerometer 127(a) is configured to measure vibration of the variable-speed circulation fan 102 at various times such as, for example, startup, during steady-state operation, and shut down. Vibration data corresponding to the variable-speed circulation fan 102 is forwarded to the HVAC controller 120. The HVAC controller 120 utilizes the vibration data to calculate and store acceptable baseline-vibration data for the variable-speed circulation fan 102. In alternate embodiments, the acceptable baseline-vibration data for the variable-speed circulation fan 102 may be set in advance by the manufacturer. The acceptable baseline-vibration data is typically used by the service provider to monitor operation of the variable-speed circulation fan 102 and detect faults before the variable-speed circulation fan 102 fails.

In similar fashion, the second accelerometer 127(b) is configured to measure vibration of the variable-speed compressor 112 at various times such as, for example, startup, steady-state operation, and shut down of the variable-speed compressor 112. Vibration data corresponding to the variable-speed compressor 112 is forwarded to the HVAC controller 120. The HVAC controller 120 utilizes the vibration data to calculate and store acceptable baseline-vibration data for the variable-speed compressor 112. In alternate embodiments, the acceptable baseline-vibration data for the variable-speed compressor 112 may be set in advance by the manufacturer.

In a typical embodiment, during operation of the HVAC system 100, the first accelerometer 127(a) measures actual vibration of the variable-speed circulation fan 102. The measured actual vibration ("actual vibration data") of the variable-speed circulation fan 102 is forwarded to the HVAC controller 120. The HVAC controller 120 compares the actual vibration data with the stored acceptable baseline-vibration data for the variable-speed circulation fan 102 to determine whether there has been changes in operation of the variable-speed circulation fan 102. For example, a change in an amplitude of vibration at a certain frequency or an occurrence of a new frequency would indicate a problem with the variable-speed circulation fan 102. The problem may be, for example, an imbalanced blower wheel, a loose mounting bolt, the variable-speed circulation fan not running, and the like. This information is forwarded by the HVAC controller 120 to the monitoring device 130 to monitor operation of the variable-speed circulation fan 102 and determine whether the variable-speed circulation fan 102 is operating appropriately or whether a fault exists. In a typical embodiment, the monitoring device 130 is not part of the HVAC system. For example, the monitoring device 130 is a server or computer of the third party such as, for example, the manufacturer, the support entity, the service provider, and the like. In other embodiments, the monitoring device 130 is located at an office of, for example, the manufacturer, the support entity, the service provider, and the like.

In similar fashion, the HVAC controller 120 is configured to receive actual vibration data of the variable-speed compressor 112 from the second accelerometer 127(b). The HVAC controller 120 compares the actual vibration data with the stored acceptable baseline-vibration data for the variable-speed compressor 112 to determine whether there has been changes in operation of the variable-speed compressor 112. For example, a change in an amplitude of vibration at a certain frequency or an occurrence of a new frequency would indicate a problem with the compressor 112. This information is forwarded by the HVAC controller 120 to the monitoring device 130 to monitor operation of the variable-speed compressor 112 and determine whether the variable-speed compressor 112 is operating appropriately or whether a fault exists.

Figure 2A:
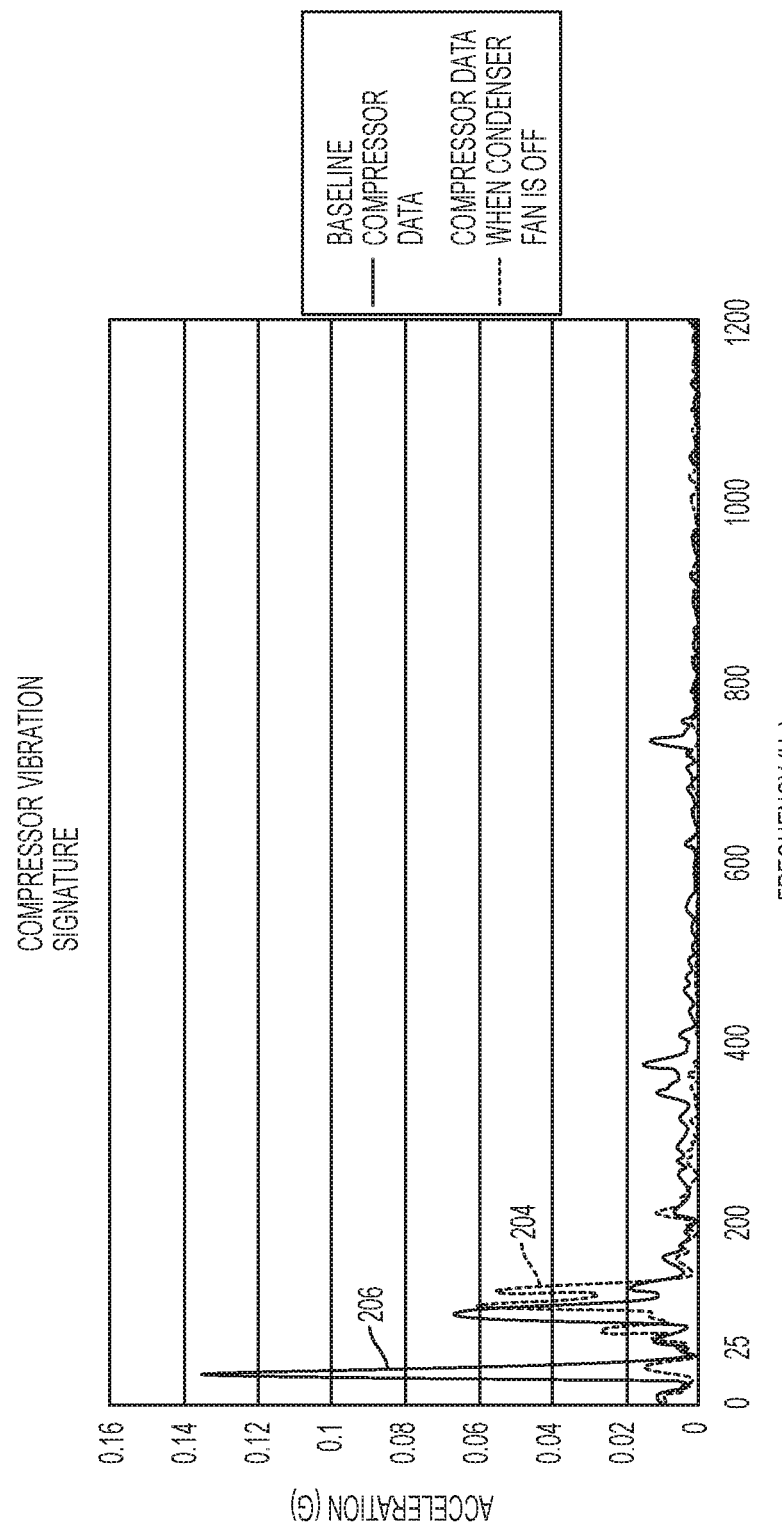
FIG. 2A is a chart illustrating acceptable baseline-vibration data and actual vibration data for a variable-speed compressor of the HVAC system according to an illustrative embodiment.

FIG. 2A is a chart illustrating actual vibration data 204 and acceptable baseline vibration data 206 for the variable-speed compressor 112 of the HVAC system 100. For illustrative purposes, FIG. 2A will be described herein relative to FIG. 1. As discussed above, the HVAC controller 120 is configured to receive actual vibration data of the variable-speed compressor 112 from the second accelerometer 127(b). The HVAC controller 120 compares the actual vibration data 204 with the stored acceptable baseline vibration data 206 for the variable-speed compressor 112 to determine whether there have been changes in operation of the variable-speed compressor 112. For example, a change in an amplitude of vibration at a certain frequency or a missing peak at a certain frequency could indicate a problem with the variable-speed condenser fan 113. FIG. 2A illustrates a missing peak at a frequency of approximately 25 Hz in the actual vibration data 204 in comparison to the acceptable baseline vibration data 206. The missing peak in the actual vibration data 204 indicates that the variable-speed condenser fan 113 is not operating properly.

Figure 2B:
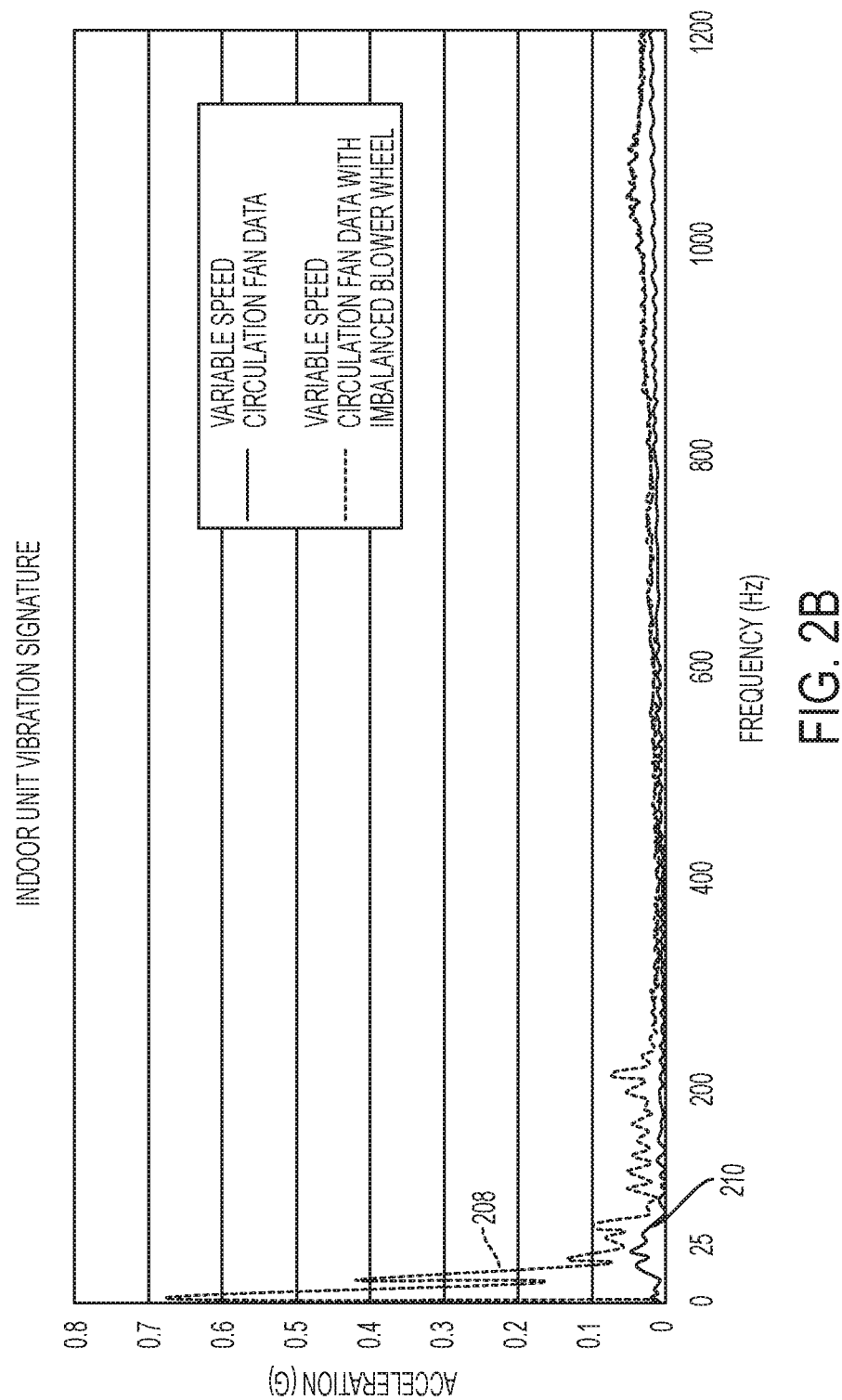
FIG. 2B is a chart illustrating acceptable baseline-vibration data and actual vibration data for an indoor unit of the HVAC system according to an exemplary embodiment.

FIG. 2B is a chart illustrating actual vibration data 208 and acceptable baseline vibration data 210 for the indoor unit 110 of the HVAC system 100. For illustrative purposes, FIG. 2B will be described herein relative to FIG. 1. As discussed above, the HVAC controller 120 is configured to receive actual vibration data of the indoor unit 110 from the first accelerometer 127(a). The HVAC controller 120 compares the actual vibration data 208 with the stored acceptable baseline vibration data 210 for the indoor unit 110 to determine whether there have been changes in operation of the indoor unit 110. For example, a change in an amplitude of vibration at a certain frequency or an amplitude spike at a certain frequency could indicate a problem with the variable-speed circulation fan 102. FIG. 2B illustrates an amplitude spike at a frequency of approximately 25 Hz in the actual vibration data 208 relative to the acceptable baseline vibration data 210. The amplitude spike in the actual vibration data 208 indicates that the variable-speed circulation fan 102 is not operating properly.

In some embodiments, the vibration data received by the HVAC controller 120 from the first and second accelerometers 127(a), 127(b) is utilized to determine whether the HVAC system components are operating properly. For example, the variable-speed circulation fan 102 operating at a given cubic feet per minute (CFM)/revolutions per minute (RPM) will have an explicit vibration pattern. If the variable-speed circulation fan 102 operates at a CFM/RPM outside an acceptable range, the vibration pattern will be different than the explicit vibration pattern. In other embodiments, the vibration data received by the HVAC controller 120 from the first and second accelerometers 127(a), 127(b) is utilized to determine whether the HVAC system components are operating at all. For example, during a call for cooling/heating, the HVAC controller 120 determines from the vibration data whether there has been an increase in the vibration level. Such increase would indicate that operation of the variable-speed circulation fan 102 has been initiated.

Figure 3:
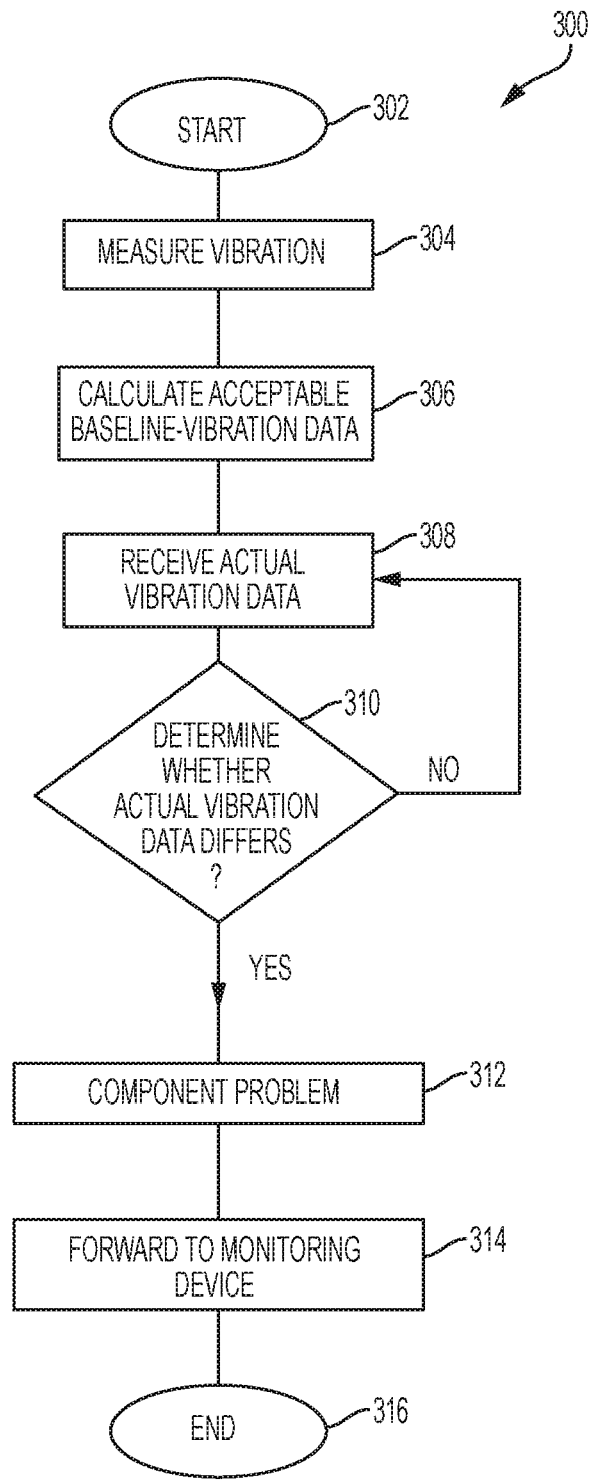
FIG. 3 is a flow diagram illustrating a method to monitor HVAC system component health.

FIG. 3 is a flow diagram illustrating an illustrative process 300 to monitor HVAC system component health. For illustrative purposes, the process 300 will be described herein relative to FIG. 1. The process 300 begins at step 302. At step 304, the first accelerometer 127(a), which is positioned on the variable-speed circulation fan 102, measures vibration of the variable-speed circulation fan 102 over time. For example, the first accelerometer 127(a) may be configured to measure vibration of the variable-speed circulation fan 102 at various times such as, for example, during system installation, during startup, steady-state operation, and shut down. In similar fashion, the second accelerometer 127(b) may measure vibration of the variable-speed compressor 112 at various times such as, for example, during system installation, during startup, steady-state operation, and shut down. Vibration data from the measurements by the first accelerometer 127(a) and the second accelerometer 127(b) is forwarded to the HVAC controller 120. At step 306, the HVAC controller 120 utilizes the vibration data to calculate and store acceptable baseline vibration data for the variable-speed circulation fan 102 and the variable-speed compressor 112. In alternate embodiments, the acceptable baseline-vibration data for the variable-speed circulation fan 102 and the variable-speed compressor 112 may be set in advance by the manufacturer.

At step 308, the HVAC controller 120 receives actual vibration data of the variable-speed circulation fan 102 and variable-speed compressor 112 from the first and second accelerometers 127(a), 127(b), respectively. From step 308, the process 300 proceeds to step 310. At step 310, it is determined whether the actual vibration data differs from pre-defined acceptable baseline vibration data by more than an acceptable amount. In particular, it is determined whether there have been changes in amplitude of vibration at certain frequencies or whether there has been an occurrence of vibration at a new frequency above a pre-defined threshold. In response to a positive determination, the process 300 proceeds to step 312. However, if it is determined at step 310 that no amplitude change or new frequency above the pre-defined threshold has been detected, the process 300 returns to step 308. At step 312, a change in the amplitude of vibration at a certain frequency or the occurrence of a new frequency above the pre-defined threshold indicates a problem with at least one of the variable-speed circulation fan 102 and the variable-speed compressor 112. The problem may be, for example, an imbalanced blower wheel, a loose mounting bolt, the variable-speed circulation fan 102 not running, and the like. At step 314, the information regarding the suspected problem is forwarded by the HVAC controller 120 to the monitoring device 130 to monitor operation of at least one of the variable-speed circulation fan 102 and the variable-speed compressor 112 and determine whether at least one of the variable-speed circulation fan 102 and the variable-speed compressor 112 is operating appropriately or whether a fault exists. At step 316, the process 300 ends.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the processor, one or more portions of the system memory, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of monitoring component health of a heating, ventilation, and air conditioning (HVAC) system, the method comprising:
    measuring, by an accelerometer associated with at least one component of the HVAC system, of vibration of the at least one component;
    receiving, by a controller, actual vibration data reflective of the measured vibration;
    determining, using the controller, whether the actual vibration data differs from pre-defined acceptable baseline vibration data by more than an acceptable amount; and
    responsive to a positive determination in the determining step, forwarding, by the controller, information regarding the determination to a monitoring device to monitor operation of the component.

2. The method of claim 1, wherein the at least one component comprises at least one of a circulation fan, a compressor, a condenser coil, a condenser fan, and an evaporator coil.

3. The method of claim 1, wherein:
    the positive determination comprises detecting a new frequency between the actual vibration data and the pre-defined acceptable baseline vibration data; and
    the new frequency indicates that the at least one component is not operating properly.

4. The method of claim 1, wherein:
    the positive determination comprises detecting an amplitude change at a certain frequency between the actual vibration data and the pre-defined acceptable baseline vibration data; and
    the amplitude change indicates that the at least one component is not operating properly.

5. The method of claim 1, wherein the monitoring device is a computer of a third party, wherein the third party comprises at least one of a manufacturer, a support entity, and a service provider.

6. The method of claim 1, wherein the controller is configured to communicate with the at least one accelerometer wirelessly.

7. The method of claim 1, wherein the controller is configured to communicate with the at least one accelerometer using a cable connection.

8. The method of claim 1 further comprising:
    responsive to a negative determination in the determining step, returning to the receiving step.

9. The method of claim 1, wherein the pre-defined acceptable baseline vibration data is set in advance by a manufacturer.

10. The method of claim 1, wherein the pre-defined acceptable baseline vibration data is calculated by the controller.

11. A heating, ventilation, and air conditioning (HVAC) system comprising:
    an accelerometer associated with at least one component of the HVAC system, wherein the accelerometer is configured to measure vibration of the at least one component;
    a controller configured to communicate with the accelerometer;
    wherein the controller is configured to:
        receive actual vibration data reflective of the measured vibration;
        determine whether the actual vibration data differs from pre-defined acceptable baseline vibration data by more than an acceptable amount; and
        responsive to a positive determination, forward information regarding the determination to a monitoring device to monitor operation of the component.

12. The HVAC system of claim 11, wherein the at least one component comprises at least one of a circulation fan, compressor, a condenser coil, a condenser fan, and an evaporator coil.

13. The HVAC system of claim 11, wherein:
the positive determination comprises detecting a new frequency between the actual vibration data and the pre-defined acceptable baseline vibration data; and
the new frequency indicates that the at least one component is not operating properly.

14. The HVAC system of claim 11, wherein:
the positive determination comprises detecting an amplitude change at a certain frequency between the actual vibration data and the pre-defined acceptable baseline vibration data; and
the amplitude change indicates that the at least one component is not operating properly.

15. The HVAC system of claim 11, wherein the monitoring device is a computer of a third party, wherein the third party comprises at least one of a manufacturer, a support entity, and a service provider.

16. The HVAC system of claim 11, wherein the controller is configured to communicate with the at least one accelerometer wirelessly.

17. The HVAC system of claim 11, wherein the controller is configured to communicate with the at least one accelerometer using a cable connection.

18. The HVAC system of claim 11, wherein the pre-defined acceptable baseline vibration data is set in advance by a manufacturer.

19. The HVAC system of claim 11, wherein the pre-defined acceptable baseline vibration data is calculated by the controller.

20. A method of monitoring component health of a heating, ventilation, and air conditioning (HVAC) system, the method comprising:
measuring, by an accelerometer associated with at least one component of the HVAC system, of vibration of the at least one component;
receiving, by a controller, actual vibration data reflective of the measured vibration;
calculating, using the controller, pre-defined acceptable baseline vibration data;
determining, using the controller, whether the actual vibration data differs from the pre-defined acceptable baseline vibration data by more than an acceptable amount; and
responsive to a positive determination in the determining step, forwarding, by the controller, information regarding the determination to a monitoring device to monitor operation of the component.

* * * * *